United States Patent Office 3,406,039
Patented Oct. 15, 1968

3,406,039
PLASTIC FILM STRUCTURES
Robert Michael Paufler, South Holland, Ill., assignor to
E. I. du Pont de Nemours and Company, Wilmington,
Del., a corporation of Delaware
No Drawing. Filed Oct. 4, 1965, Ser. No. 492,850
4 Claims. (Cl. 117—76)

This invention is concerned with tough, flexible packaging materials and more particularly with tough flexible transparent packaging materials prepared from thermoplastic films.

Considerable success has been achieved in the development of so-called quick sealing or self-sealing wrapping materials wherein a cohesive coating is applied to a porous sheet such as paper. Complications are experienced when it is attempted to adapt such cohesive coatings to smooth non-porous plastic films. The primary problem is that such cohesive coatings do not adhere well to the plastic sheet with the result that the cohesive coating is pulled from the base film under low stress applied to a wrapped article. It is known that strong adhesive bonds can be secured on non-porous plastic films through the use of various substantially tacky adhesives. However, use of such adhesives is limited in that they provide a very tacky surface with the result that a plastic film having a coating of such an adhesive will block badly when the sheet is rolled up for storage or for shipping and the like. Further, it is known that certain cohesive coatings which function satisfactorily when applied on a porous backing such as paper and show no tendency to block when wound do show blocking when they are applied on a smooth plastic film as a backing.

Accordingly, it is an object of this invention to provide a quick sealing or self-sealing plastic film wrapper which is free of the above described difficulties. It is a further object to provide a transparent tough packaging material which can be readily pressure sealed to itself and which does not show undesirable blocking to the opposite surface of the plastic film when rolled up for storage.

The foregoing objects are realized by the present invention which, briefly stated, comprises a composite film structure comprising essentially a base sheet of plastic film having on one surface thereof a subcoat of a tacky, pressure-sensitive adhesive, and a topcoat of a cohesive, substantially non-adhesive resin containing from 10% to about 20% by weight, based on the weight of the cohesive topcoat resin, of diatomaceous calcium silicate.

By the expression "cohesive, substantially non-adhesive" used herein to characterize the resin of the topcoat is meant a resin which when dry will adhere to itself, particularly when subjected to some pressure, but will not adhere to most other material even when subjected to considerable pressure. Such resins are well known to the art and in general are based on natural rubber but also include synthetic latices or resins having the cohesive properties of natural rubber.

Any plastic film having the strength, toughness, etc., required for use as wrapping tissue may be used as the base sheet. Particularly suited as base sheets for purposes of this invention are thermoplastic films such as polyethylene, polypropylene and polyethylene terephthalate films. Other thermoplastic films such as those of polyvinyl chloride, polyvinyl fluoride, polystyrene can also be employed. The base sheets may be used as cast or they can be either one way or two way oriented, depending upon the particular requirements of the finished wrapping material.

The subcoat material may be any of a large number of normally tacky pressure sensitive adhesives which show strong adhesion to such substrates as the thermoplastic films described above. Suitable base materials for such pressure adhesives include natural rubber, reclaimed rubber, butadiene/styrene copolymers, butadiene/acrylonitrile copolymers, butyl rubber, polymers of chloro butadiene, and polyisobutylene as well as polyvinyl ethers and polyalkyl acrylates. Normal tackifiers useful in such adhesive combinations include the terpene polymers, gum rosin, hydrogenated coumarone/indene resins, ethylene p-butyl phenol resins, rosin esters, petroleum resins, oil soluble phenolic resins. If desired, plasticizers may be incorporated in these adhesives and these may include such ingredients as pine tar, esters of hydrogenated rosin, liquid polybutenes, liquid polyacrylates, and the like.

It is found when the diatomaceous calcium silicate is used in the cohesive coating to the extent of between 10% and about 20% the tendency of the cohesive film to block when in contact with the opposite surface of the plastic film is entirely eliminated. Amounts of diatomaceous calcium silicate greater than 20% are not seen to be necessary and furthermore, there is a tendency for the seal strength of the cohesive coating to be diminished somewhat by the incorporation of the silicate so that in effect a good combination of freedom from blocking together with strong seal strength is attained in the concentration range as mentioned previously 10% to 20%. Amounts lower than 10% of the silicate are not sufficient to prevent at least some blocking when the film is rolled up for storage.

As indicated above, this adhesive subcoat cohesive topcoat combination is useful on a variety of plastic films. Such an adhesive combination can also be used on composite structures such as those comprising a laminate of a thermoplastic film with a non-woven web or with foil/non-woven web structures. Those are especially useful where it may be desired to have the adhesive layer on the foil or plastic film surface rather than on the non-woven web surface.

The following examples will serve to further illustrate the principles and practice of my invention.

EXAMPLE 1

A Borden Chemical Company adhesive SH-272, a butadiene/styrene copolymer latex, was applied in approximately a 0.7 mil thick layer (coating) on a film of oriented polyethylene terephthalate film. Immediately following this there was applied on the adhesive coating a layer approximately 1 mil thick of Borden Chemical Company adhesive MT-478-152B cohesive coating, a natural rubber latex, to which had been dispersed 10% of diatomaceous calcium silicate. Strips of the resulting coated film when pressure sealed topcoat-to-topcoat showed an adhesion value of 1640 grams per inch of width. When the subcoat was omitted an adhesion value of only 25 grams per inch was obtained. When the coated film was wound into a roll for shipping or storage there was no indication of blocking of the cohesive layer on the opposite, i.e., uncoated, surface of the base film.

EXAMPLE 2

A 1 mil thick sheet of oriented polypropylene film was coated with a 1 mil thick layer of Chemigum Latex 520, a carboxylic modified butadiene acrylonitrile copolymer from Goodyear Chemical Company, and was topcoated with a Union Paste Company adhesive M-682-T to which had been added 10% of diatomaceous calcium silicate (Micro-Cel T-26 from Johns Manville Company). When the cohesive coated surfaces were pressed together and the degree of cohesion measured, adhesion values of 400 grams per inch were obtained; by contrast, a control wherein the subcoat was omitted gave a value of only 25 grams per inch.

EXAMPLE 3

The procedure of Example 1 was repeated except that a 4 mil thick polyethylene film was used in place of the polyethylene terephthalate film. The resulting cohesive coated film structure showed an adhesion value of 900 grams per inch, whereas the same structure without the adhesive subcoat showed a value of about 25 grams per inch.

What is claimed is:

1. A composite structure comprising essentially a base sheet of plastic film having on one surface thereof a subcoat of a tacky pressure-sensitive adhesive, and a topcoat of a cohesive substantially non-adhesive resin containing from 10% to about 20% by weight, based on the weight of the cohesive topcoat resin, of diatomaceous calcium silicate.

2. The structure of claim 1 wherein said plastic film is polyethylene terephthalate film.

3. The structure of claim 1 wherein said plastic film is polyethylene film.

4. The structure of claim 1 wherein said plastic film is polypropylene film.

References Cited

UNITED STATES PATENTS

| 1,785,081 | 12/1930 | Haertel | 117—80 |
| 2,781,159 | 2/1957 | Copeman | 117—33 |
| 3,027,271 | 3/1962 | Plasse et al. | 117—122 X |
| 3,099,350 | 7/1963 | Hammond | 206—46 |
| 3,218,185 | 11/1965 | Letteron | 117—122 X |

FOREIGN PATENTS 505,502   5/1939   Netherlands.

WILLIAM D. MARTIN, *Primary Examiner.*

B. D. PIANALTO, *Assistant Examiner.*